US011977652B2

(12) United States Patent
Magen

(10) Patent No.: US 11,977,652 B2
(45) Date of Patent: May 7, 2024

(54) SECURE COMPARTMENTED ACCESS INFRASTRUCTURE FOR SENSITIVE DATABASES

(71) Applicant: Evernorth Strategic Development, Inc., St. Louis, MO (US)

(72) Inventor: Jonathan E. Magen, Jenkintown, PA (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 331 days.

(21) Appl. No.: 17/543,908

(22) Filed: Dec. 7, 2021

(65) Prior Publication Data
US 2023/0177192 A1  Jun. 8, 2023

(51) Int. Cl.
*G06F 21/00* (2013.01)
*G06F 21/53* (2013.01)
*G06F 21/62* (2013.01)

(52) U.S. Cl.
CPC .......... *G06F 21/6218* (2013.01); *G06F 21/53* (2013.01); *G06F 2221/031* (2013.01)

(58) Field of Classification Search
CPC . G06F 21/6218; G06F 21/53; G06F 2221/031
See application file for complete search history.

(56) References Cited

U.S. PATENT DOCUMENTS

| | | | |
|---|---|---|---|
| 8,225,305 B2 | 7/2012 | Huestis | |
| 9,495,142 B2 | 11/2016 | Koushik | |
| 9,703,544 B1 | 7/2017 | Feeser | |
| 9,715,402 B2 | 7/2017 | Wagner | |
| 10,230,571 B2 | 3/2019 | Rangasamy | |
| 10,601,942 B2 | 3/2020 | Walsh | |
| 10,608,892 B2 | 3/2020 | Savov | |
| 10,761,826 B2 | 9/2020 | Koushik | |
| 10,848,974 B2 | 11/2020 | Bachmutsky | |
| 10,855,794 B2 | 12/2020 | Walsh | |
| 10,880,392 B2 | 12/2020 | Walsh | |
| 10,979,521 B2 | 4/2021 | Walsh | |
| 11,200,330 B2* | 12/2021 | Chen | G06F 9/5077 |
| 11,301,562 B2* | 4/2022 | Tiwary | G06F 16/2471 |

(Continued)

FOREIGN PATENT DOCUMENTS

| | | | | |
|---|---|---|---|---|
| EP | 2819058 A1 * | 12/2014 | ....... | G06F 16/24534 |
| WO | WO-2020123696 A1 * | 6/2020 | ............ | G16H 10/20 |
| WO | WO-2022185324 A1 * | 9/2022 | | |

*Primary Examiner* — Kendall Dolly
(74) *Attorney, Agent, or Firm* — Miller Johnson

(57) ABSTRACT

A system for providing compartmented access to secure data assets includes a mobile device, a secure access platform, and a secure data storage platform. The mobile device may be configured to generate a user interface configured to allow a user to input credentials and a request for a secure data asset on the secure data storage platform. The mobile device may transmit the credentials and the request to a secure access platform. The secure access platform may transmit the credentials to the secure data storage platform. The secure data storage platform may transfer a copy of the secure data assets to a data access module on the secure data access platform. The secure access platform may be configured to create an appling instance, receive the copy of the secure data assets, and transmit a response package based on the copy of the secure data access to the mobile device.

20 Claims, 15 Drawing Sheets

(56) References Cited

U.S. PATENT DOCUMENTS

| | | | |
|---|---|---|---|
| 11,429,733 B2* | 8/2022 | Werner | G06F 21/53 |
| 2015/0244735 A1 | 8/2015 | Kumar | |
| 2017/0316221 A1* | 11/2017 | Melanchenko | G06F 21/6218 |
| 2017/0351856 A1* | 12/2017 | McGeorge | H04L 67/34 |
| 2018/0004969 A1* | 1/2018 | Getson | G06F 21/6218 |
| 2019/0279281 A1* | 9/2019 | Kumar | G06Q 30/0631 |
| 2020/0174773 A1 | 6/2020 | Borlick | |
| 2022/0138335 A1* | 5/2022 | Rachlin | G06F 8/60 |
| | | | 726/27 |
| 2022/0391494 A1* | 12/2022 | Yang | G06F 21/6209 |
| 2023/0015726 A1* | 1/2023 | Jung | G06F 21/53 |

* cited by examiner

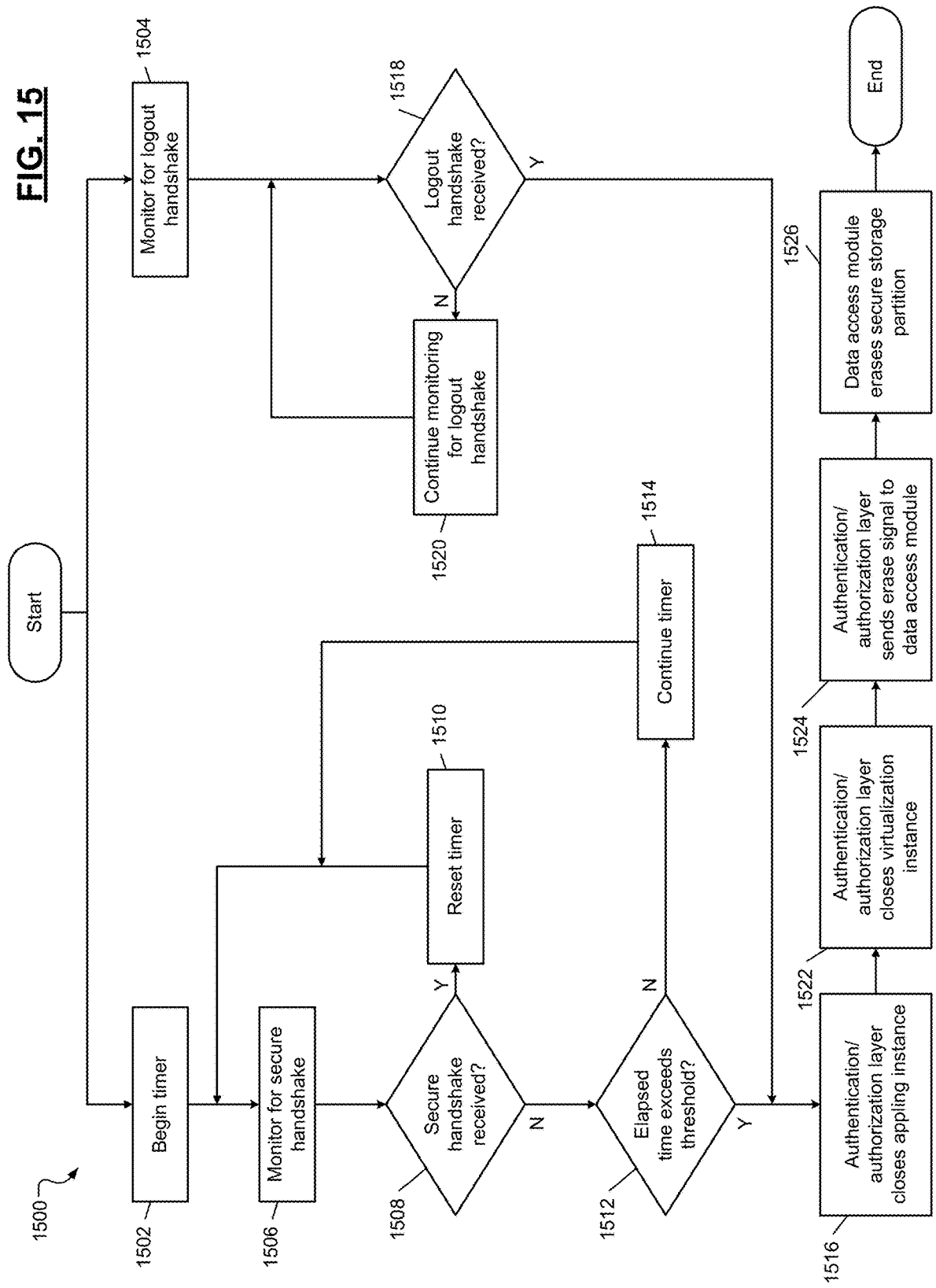

SECURE COMPARTMENTED ACCESS INFRASTRUCTURE FOR SENSITIVE DATABASES

FIELD

The present disclosure relates to server database security and, more particularly, to authenticating a remote client and providing secure access to authorized data on a server database.

BACKGROUND

Modern information privacy laws—such as the Health Insurance Portability and Accountability Act (HIPAA)—provide consumers with wide ranging protections for their health data. In order to better protect consumers, HIPAA imposes a series of specific and stringent requirements for "covered entities," such as health plans, health care clearinghouses, and health care providers for securely storing and transmitting electronic protected health information (EPHI). Generally, HIPAA requires covered entities to ensure the confidentiality, integrity, and availability of EPHI, protect against reasonably anticipated threats and hazards to the EPHI, protect against reasonably anticipated unnecessary disclosures of EPHI, and ensure compliance among their workforces.

In the years following HIPAA's enactment, the high-tech sector saw rapid advances in consumer electronics such as smart phones, tablets, and personal computers, as well as the network hardware and infrastructure supporting these new consumer electronic devices. As consumer electronics grew in their adoption and variety, so too did the service and content providers serving these new consumer devices. Initially, service and content providers were required to manage and configure their own physical servers (the "bare metal"). This model proved expensive in both time and treasure. Not only were service and content providers required to manage and configure the physical server hardware, but they were also required to maintain the software environment (e.g., the operating system) that the consumer-serving software applications would be deployed to.

As more and more service and content providers entered the consumer market, innovative technological solutions were required to reduce the cost of entry for smaller entities. Initially, some service and content providers outsourced the "bare metal," deploying their consumer-serving software applications to "virtual machines" hosted on another entity's "bare metal." Still, under this model, the service and content providers were required to maintain the software environment that the consumer-serving software applications were deployed on. Eventually, service and content providers shifted to the "containers" model. Under this model, the work of maintaining the software environment could also be outsourced to third party providers. However, given the variety and inconsistency of the software environments used by various third party providers (e.g., different versions of different operating systems), it became ever more challenging for service and content providers to maintain versions of their software that would be compatible across the wide range of operating systems. The development of "containers"—which are standard units of software packing the software code and all of its dependencies into a single "container"—ensured that software applications could be deployed quickly and reliably across a wide range of software environments.

However, in order to provide persistent and reliable service to consumers under the "container" model, at least one instance of any given consumer-serving software application would need to be running at all times to provide the consumer electronic device constant, uninterrupted access to the consumer-serving software application. The advent of the "serverless" or function-as-a-service (FaaS) model of cloud computing addressed these inefficiencies. Under the FaaS model, single units of deployment of the consumer-serving software application code (referred to as the "function") are run by "events" as needed. When the consumer electronic device needs access to the consumer-serving software application, the consumer electronic device can create an "event," which calls on the cloud-hosted "function" and runs the consumer-serving software application code in real-time only when it is needed.

While the FaaS model of cloud computing realizes significant cost-saving benefits for service and content providers as well as server resource optimization benefits for cloud service providers, the model nevertheless presents challenges to HIPAA "covered entities." For example, any EPHI passing through the servers hosting the consumer-serving software application must be protected against reasonably anticipated threats and hazards, such as unnecessary and unauthorized disclosures. Thus, improved systems and methods allowing consumers to realize the cost-saving benefits of accessing their EPHI through FaaS cloud deployments while simultaneously protecting the EPHI against unnecessary and unauthorized disclosure are beneficial and desirable.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for providing compartmented access to secure data assets is presented. The system may include a mobile device, a secure access platform, and a secure data storage platform. The mobile device may include a first processor, an input device, a data analysis application, and a first transceiver. The secure access platform may include an authentication module, a sandbox orchestrator, a second processor, and a second transceiver. The secure data storage platform may include a third processor, a secure data access module, a secure database including a secure data asset, and a third transceiver. The first processor, the input device, and the data analysis application may be configured to generate a user interface configured to allow a user to input credentials and a request for the secure data asset. The first processor, the data analysis application, and the first transceiver may be configured to transmit the credentials to the authentication module and the request for access to the sandbox orchestrator via the second transceiver.

The second processor, the authentication module, and the second transceiver may be configured to transmit the credentials to the secure data access module via the third transceiver. The third processor and the secure data access module may be configured to transfer a copy of the secure data asset to the secure data access module. The second processor, the sandbox orchestrator, and the second transceiver may be configured to generate a virtualization instance, select an appling from the appling model catalog, and create an appling instance of the selected appling in the virtualization instance. The second processor, the sandbox orchestrator, the appling instance, and the second transceiver may be configured to receive the copy of the secure data asset from the secure data access module, format a response package based on the copy of the secure data asset, and transmit the response package to the data analysis application via the first transceiver.

In other features, the secure database may include a plurality of unauthorized data assets. The secure data module may be configured to determine that the credentials do not provide access to each of the plurality of unauthorized data assets, and determine that the credentials provide access to the secure data asset. In other features, the third processor and the secure data access module may be configured to transfer a copy of the secure data asset to a secure storage partition.

In other features, the second processor, the sandbox orchestrator, the appling instance, and the second transceiver may be configured to determine that the copy of the secure data asset contains a correct data type, and, in response to determining that the copy of the secure data asset contains the correct data type, format the response package to contain data extracted from the secure data asset. In other features, the response package may be formatted in a Fast Healthcare Interoperability Resource (FHIR) format.

In other features, the second processor, the sandbox orchestrator, the appling instance, and the second transceiver may be configured to determine that the copy of the secure data asset does not contain a correct data type, and, in response to determining that the copy of the secure data asset does not contain the correct data type, format the response package to contain an error code. In other features, the second processor, the authentication module, and the sandbox orchestrator may be configured to close the appling instance in response to a condition. In other features, the second processor, the authentication module, and the sandbox orchestrator may be configured to close the virtualization instance in response to the condition.

In other features, the second processor, the authentication module, and the sandbox orchestrator may be configured to send an erase signal to the secure data access module. In other features, the third processor and the secure data access module are configured to purge the copy of the secure data asset from the secure data access module in response to the erase signal. In other features, the condition may include transmission, by the second processor, the sandbox orchestrator, the appling instance, and the second transceiver, of the response package. In other features, the condition may include a determination by the authentication module that a session of the data analysis application timed out. In other features, the condition may include a determination by the authentication module that a session of the data analysis application ended.

In other features, the second processor and the sandbox orchestrator may be configured to generate a second virtualization instance, select a second appling from the appling model catalog, and create a second appling instance of the selected second appling in the second virtualization instance. In other features, the virtualization instance may be isolated from the second virtualization instance, and the appling instance may be isolated from the second appling instance. In other features, the mobile device may be isolated from the second virtualization instance and the second appling instance.

A method for providing compartmented access to secure data assets is presented. The method may include transmitting credentials from a mobile device to an authentication module on a secure access platform, transmitting a request for access from the mobile device to a sandbox orchestrator on the secure access platform, transmitting the credentials from the authentication module to a secure data access module on a secure data storage platform, and determining, at the secure data access module, which of a plurality of secure data assets stored on a secure database the credentials provide access to. The method may also include transferring, to the secure data access module, selected data assets. The selected data assets may be the secure data assets that the credentials provide access to. The method may further include generating, at the secure access platform, a virtualization instance, running, at the secure access platform, an appling instance in the virtualization instance, receiving the selected data assets transmitted from the secure data access module using the appling instance, formatting the selected data assets using the appling instance, and transmitting the formatted selected data assets from the appling instance to the mobile device.

In other features, the formatted selected data assets are in a Fast Healthcare Interoperability Resources (FHIR) format. In other features, the method further includes closing the appling instance in response to transmitting the formatted selected data assets from the appling instance to the mobile device, and closing the virtualization instance in response to transmitting the formatted selected data assets from the appling instance to the mobile device. In other features, the method includes generating, at the secure access platform, a second virtualization instance, and running, at the secure access platform, a second appling instance in the second virtualization instance. The virtualization instance may be isolated from the second virtualization instance, and the appling instance may be isolated from the second appling instance.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 15 is an example flowchart of a process for ensuring that sensitive data is secured.

In the drawings, reference numbers may be reused to identify similar and/or identical elements.

DETAILED DESCRIPTION

Hardware and Software Components

The hardware and software described herein provide for a secure access and processing of data, which is based on message passing between components and does not allow for components to directly access information stored in other components. For example, a user device can request information results from a data processing system. The system has an access layer that authenticates the user device to a secure access platform. The platform can send a message to an orchestration layer in the data storage platform of what data has been requested by the user device. The user device does not connect directly with the data storage platform. The orchestration layer sends a message to launch an appling, which can be stored in an intermediate form and can be interpreted into a single instance. The data is supplied to the appling in a virtual environment in the data storage platform. The appling runs its function on the data and outputs a result to the input/output (I/O) of the data storage platform. The appling instance ends. The data storage platform sends a message back to the user device with the result from the single instance appling.

Figure 1:
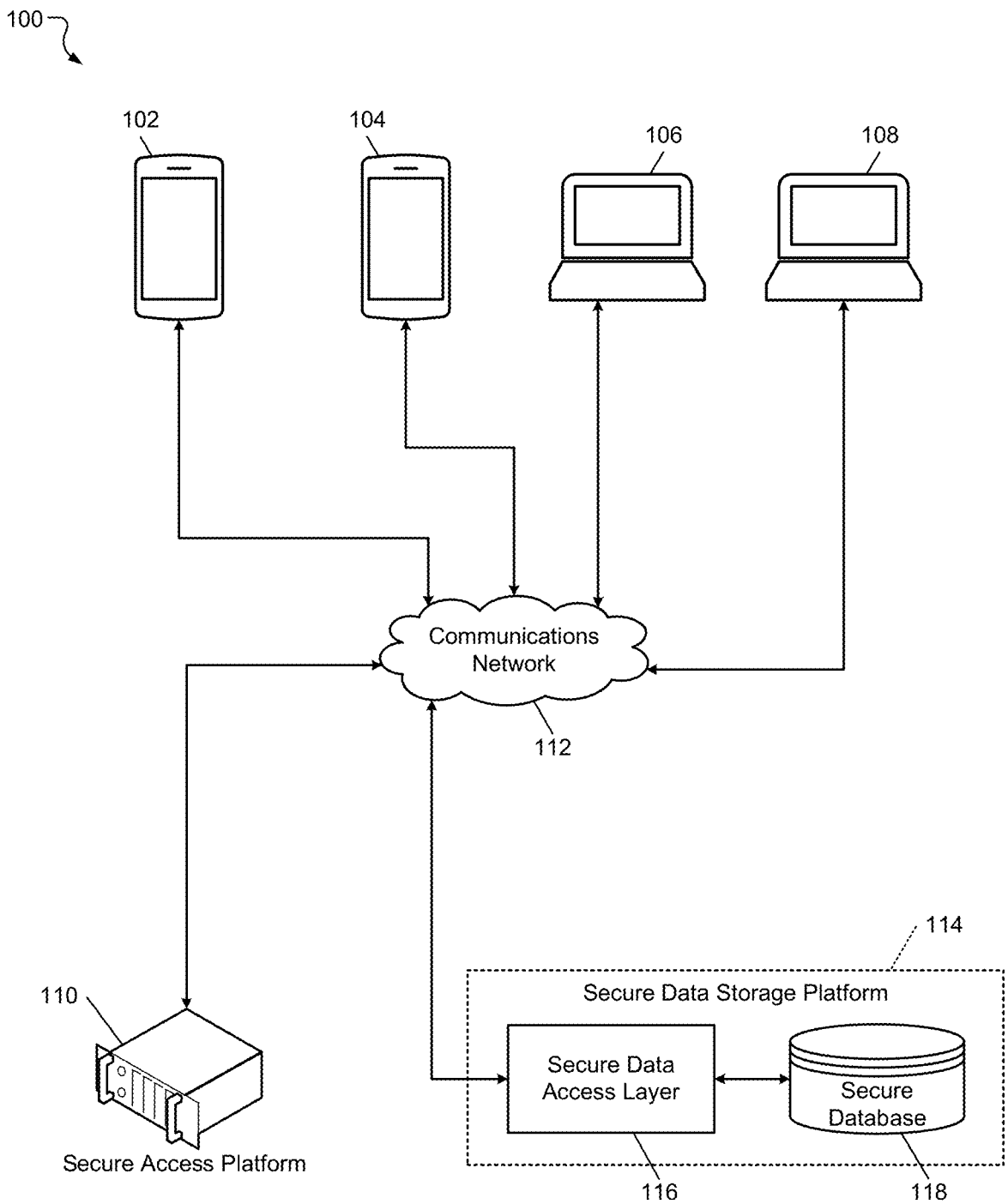
FIG. 1 is a high-level schematic diagram of a secure data access and retrieval system.

FIG. 1 is a high-level schematic diagram of a secure data access and retrieval system 100. One or more mobile devices, such as user devices 102 and 104, and/or one or more personal computing devices, such as analyst devices 106 and 108 may communicate with a first server, such as secure access platform 110 via a communications network 112. In various implementations, the secure access platform 110 may be a cloud computing service platform, such as a FaaS platform. The secure access platform 110 may communicate with a second server, such as a secure data storage platform 114. The secure data storage platform 114 may include a gatekeeper, such as secure data access layer 116, and a database containing information which needs to be safeguarded and protected, such as secure database 118.

In operation, an application on one of the client devices, such as one of the user devices 102 and 104 or one of the analyst devices 106 or 108, may request access to sensitive data, such as EPHI, stored on the secure database 118. For example, user device 102 may send a request for data to the secure access platform 110. The request may include user credentials, and the secure access platform 110 may send the request and credentials to the secure data access layer 116 via communications network 112. The secure data access layer 116 may determine whether the user device 102 has permission to access the requested data stored in the secure database 118. If the secure data access layer 116 determines that access is authorized, the secure data access layer 116 may provide the data to the secure access platform 110 via communications network 112. However, the user devices 102 and 104 and analyst devices 106 cannot access the data on the secure data storage platform 114 directly. Applings, as described herein, are the components that process then data and generate the data requested by the user device.

In various implementations, the secure data access layer 116 may be "stateless," and the data may be pass through the secure data access layer 116 to the secure access platform 110 without being stored on the secure data access layer 116 itself. A "stateless" computer program is a computer program which does not keep a record of any previous interactions. Each interaction request will be handled entirely based on the information contained within the request. Thus, in examples where the secure data access layer 116 is "stateless," neither the request for data nor the credentials from the secure access platform 110 are stored by the secure data access layer 116. In various implementations, the secure data access layer 116 may temporarily store the data until the session between the user device 102 and the secure access platform 110 is ended or times out.

Figure 2:
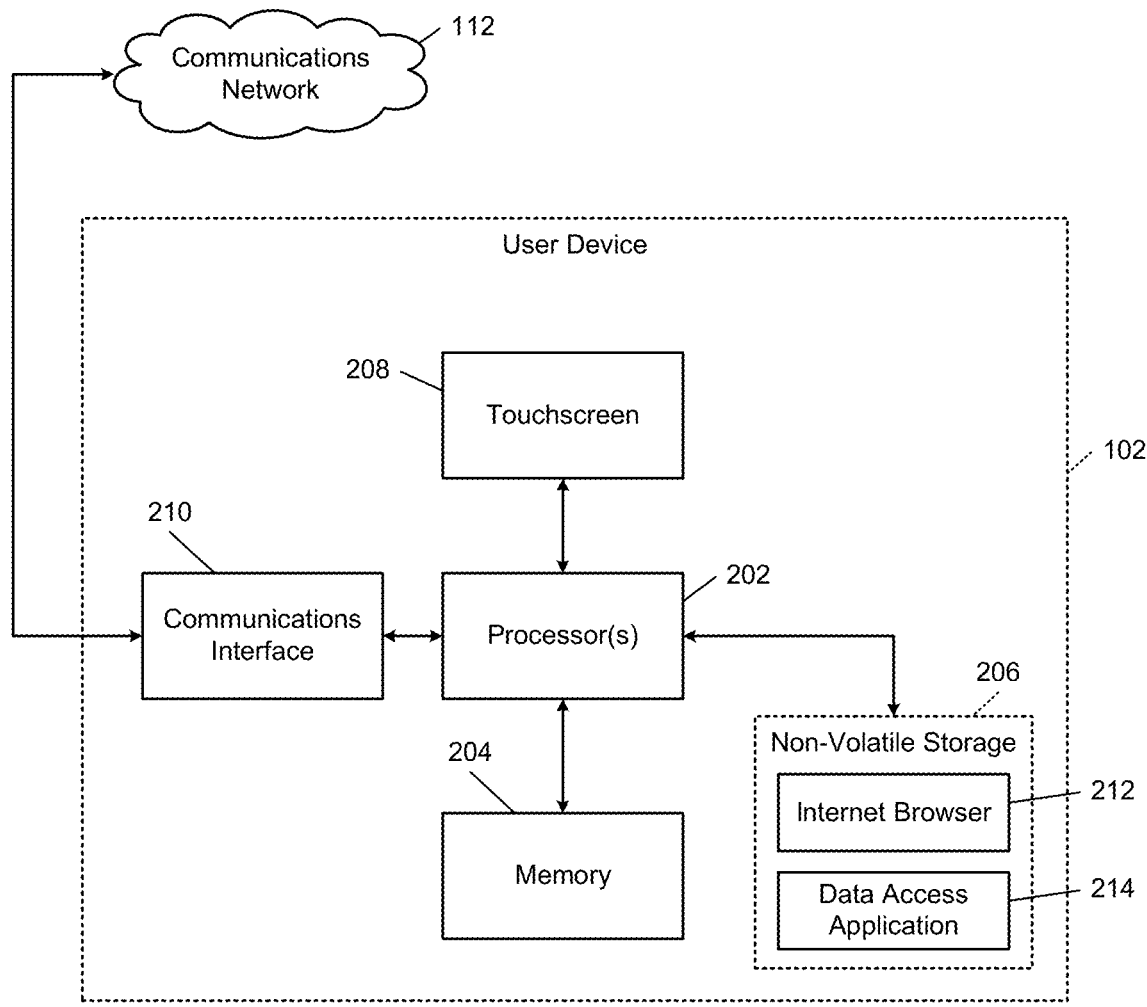
FIG. 2 is a schematic diagram of an example of the user device.

FIG. 2 is a schematic diagram of an example of the user device 102 of the system 100 of FIG. 1. The user device 102 may include a computer or a microprocessor. For example, the user device 102 may include a processor 202, volatile or non-volatile computer memory 204, such as random-access memory (RAM), and a non-transitory computer-readable storage medium, such as non-volatile storage 206. In various implementations, the non-volatile storage 206 may include a hard disk drive (HDD), single-level cell (SLC) NAND flash, multi-level cell (MLC) NAND flash, triple-level cell (TLC) NAND flash, quad-level cell (QLC) NAND flash, NOR flash, or any other suitable non-volatile memory or non-volatile storage medium accessible by the processor 202. The user device 102 may also include a touchscreen 208. Touchscreen 208 may serve as both an input device as well as an output device. The user device 102 may also include a transceiver, such as communications interface 210, for communicating with the communications network 112. The computer memory 204, non-volatile storage 206, touchscreen 208, and communications interface 210 may each be operatively coupled to the processor 202 and/or each other. In various implementations, one or more software modules, such as an Internet browser 212 and/or a data analysis application 214 may be stored on non-volatile storage 206 and executed on the processor 202.

Figure 3:
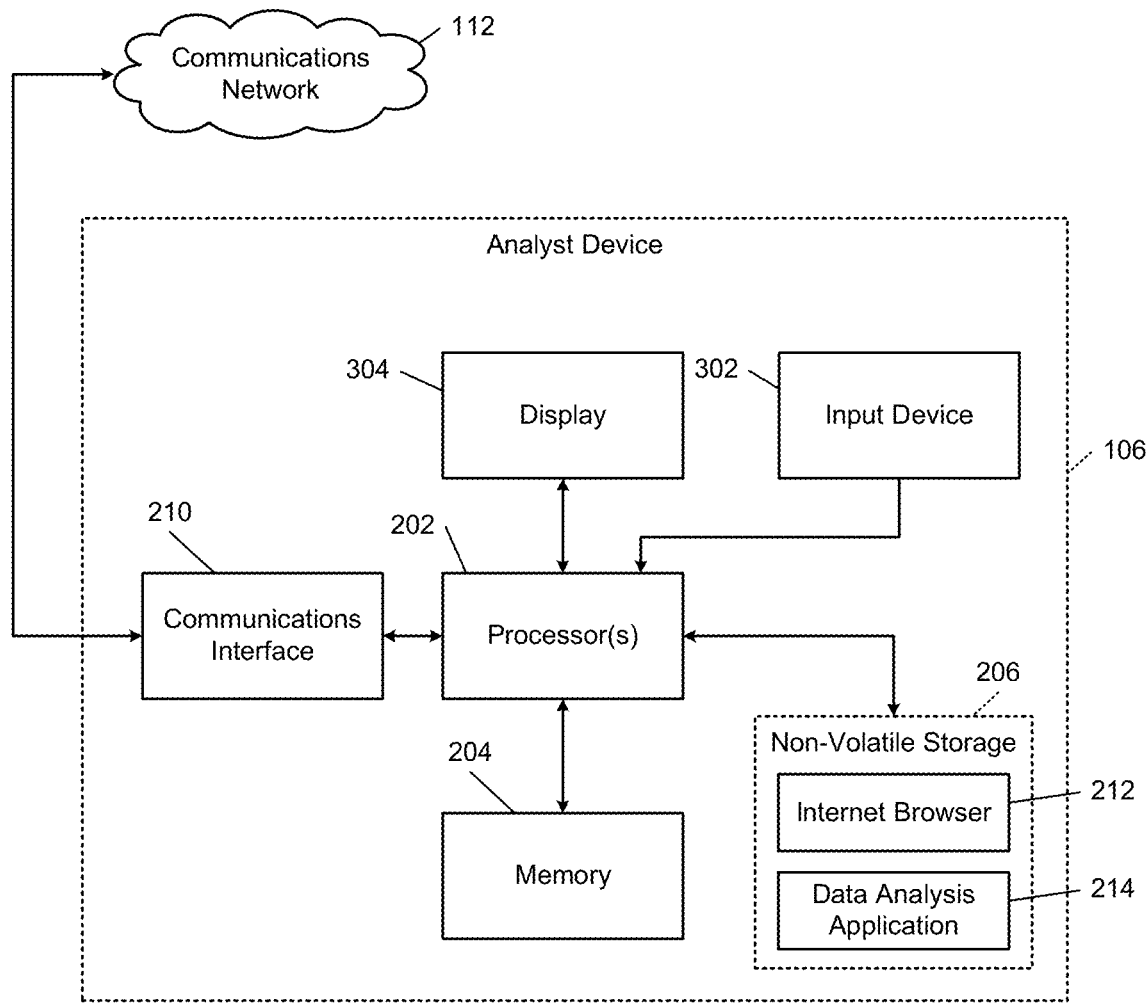
FIG. 3 is a schematic diagram of an example of the analyst device.

FIG. 3 is a schematic diagram of an example of the analyst device 106 of the system 100 of FIG. 1. In various implementations, the analyst device 106 may have a different from factor than the user device 102 of FIG. 2, and include one or more separate input devices, such as input device 302. In various implementations, the input device 302 may be a keyboard, mouse, or trackpad. In various implementations, the analyst device may have one or more separate output devices, such as a display 304. As illustrated in the example, of FIG. 3, the input device 302 and display 304 may be operatively coupled to the processor 202, the other components of the analyst device 106, and/or each other. In various implementations, the touchscreen 208 of the user device 102 may be omitted from the analyst device 106.

Figure 4:
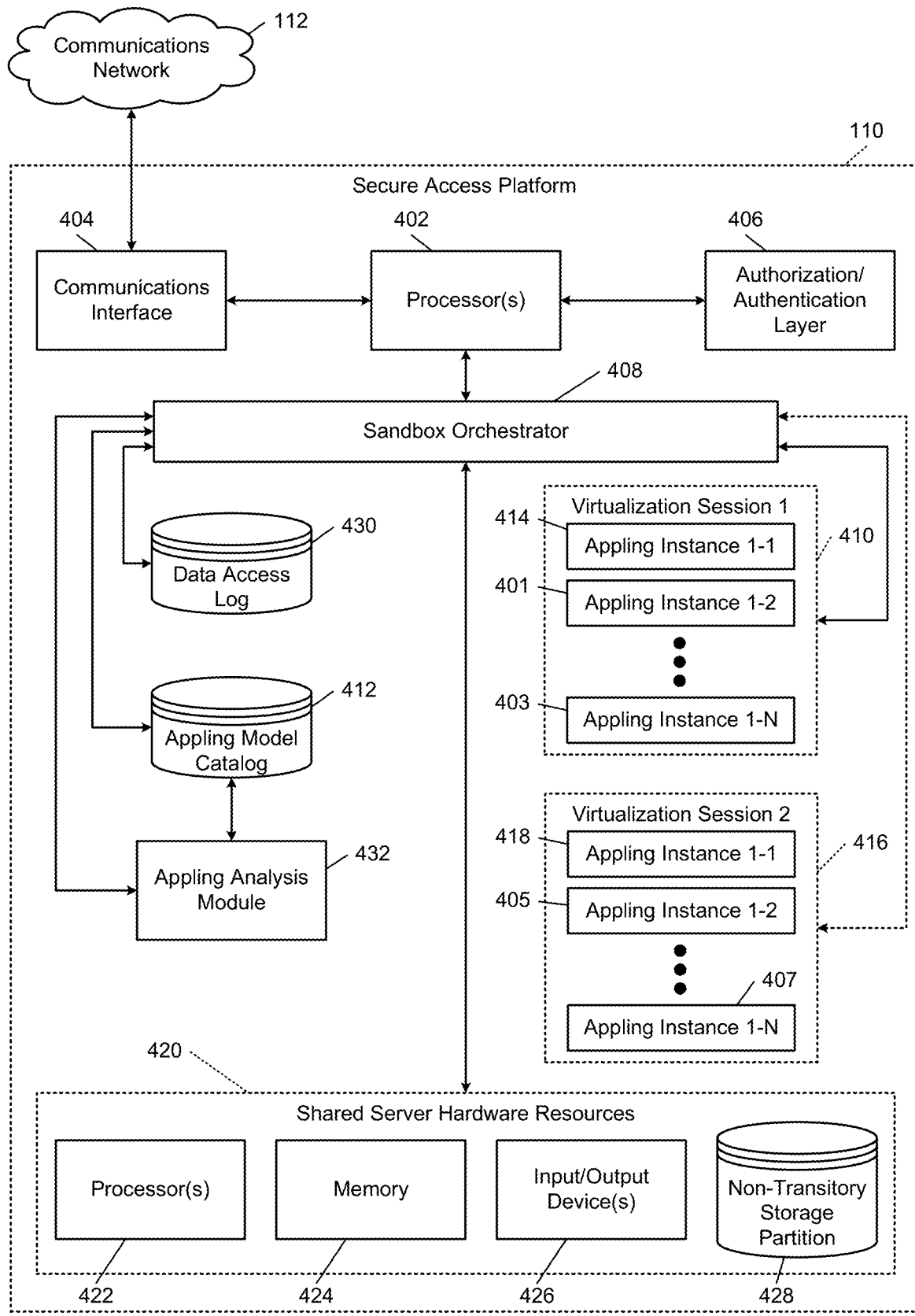
FIG. 4 is a schematic diagram of an example of the secure access platform.

FIG. 4 is a schematic diagram of an example of the secure access platform 110 of the system 100 of FIG. 1. The secure access platform 110 may have one or more microprocessors, such as processor 402. In various implementations, the processor 402 may be operatively coupled to a transceiver for communicating with the communications network 112, such as communications interface 404. In various implementations, the secure access platform 110 may also include one or more software modules. For example, the secure access platform 110 may include an access delegation layer, such as an authorization/authentication layer 406.

In various implementations, the secure access platform 110 may also include a virtual machine monitor or emulator, such as a hypervisor or service management automation module, such as a sandbox orchestrator 408. In various implementations, the sandbox orchestrator 408 may be executed on the processor 402. In an example, one virtual machine can be directed to only prescription drug handling and another virtual machine can handle medical claims. The sandbox orchestrator 408 may be a software, firmware, or hardware module which creates and runs virtual machines on the secure access platform 110. In various implementations, the sandbox orchestrator 408 may automate the creation, monitoring, and deployment of resources in the secure access platform 110. For example, the sandbox orchestrator 408 may create a virtual machine instance, such as virtualization session 410 (labeled "Virtualization Session 1" in the figures), select portable binary code—an "appling"—from an appling model catalog 412, and execute the appling as an appling instance 414 within the virtualization session 410.

In various implementations, applings are "stateless"—there is no global state used by the appling or changed by the appling. An appling may run within multiple different virtual machines using different instances. In various implementations, applings may be "pure functions." A "pure function" is a function which is "total," "deterministic," and "inculpable." A "total function" produces an output for every input. A "deterministic function" always produces the same output for any given input—the output behavior of a "deterministic function" is determined solely by its input. An "inculpable function" produces no side effects—it has no impact on the external environment, but generates only an output value. In various implementations, applings may be "referentially transparent"—the appling may be replaced by the value it outputs with no impact to the function calling on the appling.

The appling model catalog 412 stores images of the applings in an intermediate format. The applings are stored in the intermediate state so that they are already compiled and ready to be interpreted, e.g., as a portable executable. For example, the intermediate state of the appling images allows the applings to be stood up to perform their one or more functions on the data. Once the one or more functions are run, the appling ends and that instance of the appling ceases to exist. In an example embodiment, the appling model catalog 412 only stores the applings, e.g., the applings cannot be edited in the appling model catalog. The applings must be written or edited outside the appling model catalog 412.

In various implementations, applings may be written in WebAssembly byte code or Java byte code. Other portable executables or portable intermediate code formats are within the scope of the present disclosure. In an example embodiment, the applings can be stored in .NET byte code (e.g., common intermediate language) or WebAssembly. The applings are stored in the intermediate state so that they are already compiled and ready to be interpreted and run in a single instance. In various implementations, each appling may be complied ahead of time, just-in-time, or may use an interpreter. In an example embodiment, the applings can be pre-compiled binaries. In various implementations, each appling may be a data transformation function that does not have query access. For example, applings may be invoked only with data that has already been queried on the user's behalf. In various implementations, applings themselves cannot access data—they can only receive data they have been given. In various implementations, applings may produce responses in the Fast Healthcare Interoperability Resources (FHIR) format, or in any other suitable format.

In various implementations, the sandbox orchestrator 408 may create multiple virtual machines and run one or more applings on each virtual machine. For example, as illustrated in FIG. 4, multiple applings may be run on virtualization session 414. In various implementations, additional appling instances—such as appling instance 401 (labeled "Appling Instance 1-2" in the figures) through an N-th appling instance such as appling instance 403 (labeled "Appling Instance 1-N" in the figures)—may be run on the same virtualization session. In various implementations, the sandbox orchestrator 408 may create a second virtualization session 416 (labeled "Virtualization Session 2" in the figures) and run a second appling instance 418 (labeled "Appling Instance 2-1" in the figures) on the second virtualization session 416. In various implementations, additional appling instances—such as appling instance 405 (labeled "Appling Instance 2-2" in the figures) through an N-th appling instance such as appling instance 407 (labeled "Appling Instance 2-N" in the figures)—may be run on the second virtualization session 416. In an example embodiment, the virtualization sessions can be run as a session without provisioning or managing the underlying hardware server in a cloud computing environment, e.g., a lambda virtual application AWS or continuous integration/continuous delivery pipeline in Azure.

In various implementations, each appling instance within a virtual machine may be different instances of the same or different appling. For example, appling instances 414, 401, and 403 may be different instances of the same appling, or may be different instances of different applings. In various implementations, some of appling instances 414, 401, and 403 may be different instances of the same appling. Similarly, appling instances 418, 405, and 407 may be different instances of the same appling, or may be different instances of different applings. In various implementation, some of appling instances 418, 405, and 407 may be different instances of the same appling.

In various implementations, each virtual machine may be "sandboxed" by the sandbox orchestrator 408 or isolated from each other. For example, while virtualization session 410 may access processor(s) 402 and additional shared server hardware resources 420 such as processor(s) 422, memory 424, input/output device(s) 426, and/or non-transitory storage partition(s) 428 through the sandbox orchestrator 408, the virtualization session 410 may be restricted or forbidden by the sandbox orchestrator 408 from communicating with the second virtualization session 416. In various implementations, the virtualization instance(s) and appling(s) may communicate with the communications network 112 through the sandbox orchestrator 408, which is operatively coupled to the communications interface 404. All communications for each virtualization instance and each appling instance may be logged by the sandbox orchestrator 408 in a data access log 430.

In various implementations, the secure access platform 110 may also include a module for analyzing and testing untrusted appling code. For example, the secure access platform may include an appling analysis module 432. In various implementations, the sandbox orchestrator 408 may create the second virtualization session 416 in order to analyze and test an untrusted appling, such as the second appling instance 418. The appling analysis module 432 may inspect the behavior of the second appling instance 418 in the sandboxed second virtualization session 416 in order to ensure that the second appling instance 418 does not exhibit malicious behavior. In various implementations, the appling analysis module 432 may analyze the bytecode of an appling by directly accessing the appling in the appling model catalog 412 without running the appling in a virtualization instance.

Figure 5:
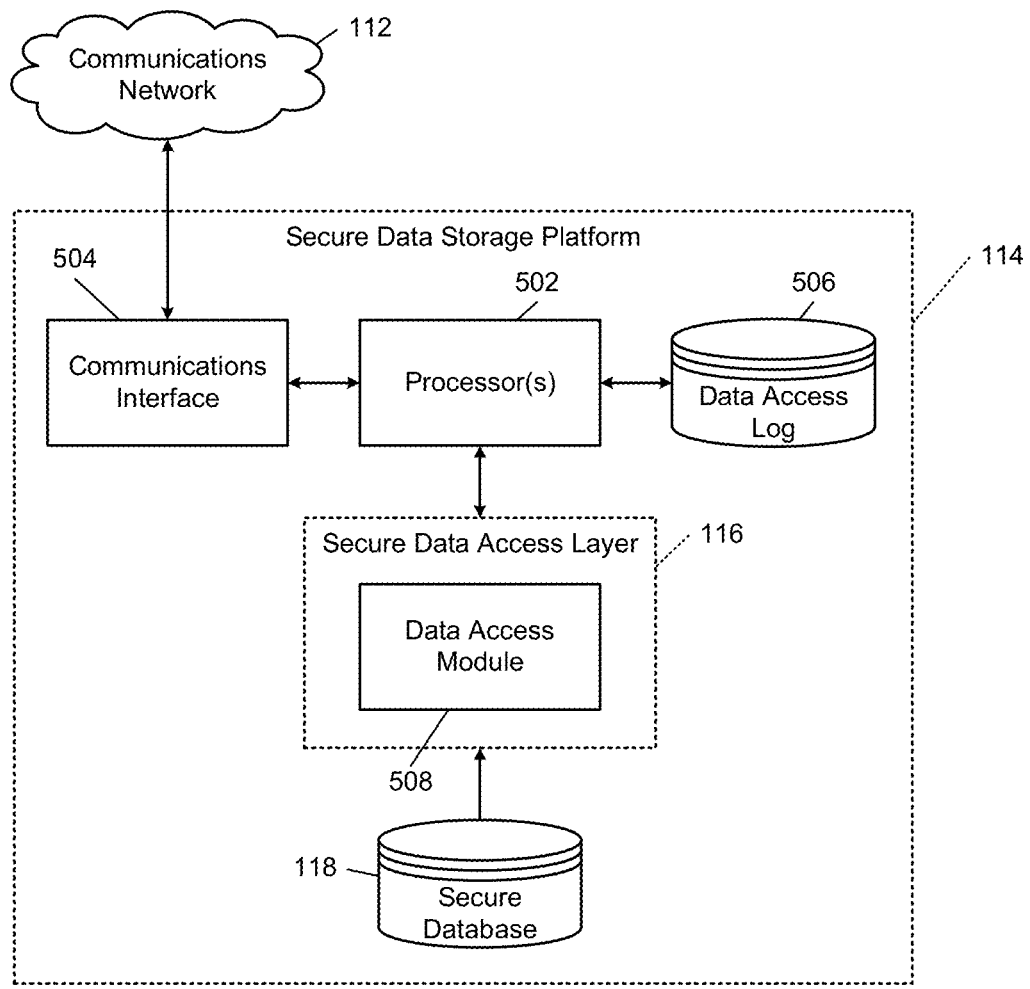
FIG. 5 is a schematic diagram of an example of the secure data storage platform.

FIG. 5 is a schematic diagram of an example of the secure data storage platform 114 of the system 100 of FIG. 1. As shown in FIG. 5, the secure data storage platform 114 may include one or more processor(s) 502 operatively coupled to the previously described secure data access layer 116 and secure database 118. The processor(s) 502 may also be operatively coupled to a transceiver for communicating with the communications network 112, such as communications interface 504, and a data access log 506. In various implementations, the secure data access layer 116 may include a data access module 508. In various implementations, the data access module 508 may be executed on the processor 502. In various implementations, the data access module 508 may be "stateless." In various implementations, the data access module 508 may receive credentials and/or a request for data from the communications network 112, communications interface 504, and/or processor 502, and return selected data assets from the secure database 118 based on the credentials and/or request for data. In various implementations, the data access module 508 may pass the returned selected data assets through directly to the processor 502, communications interface 504, and/or communications network 112 without saving them to any non-transitory storage medium. In various implementations, any activity on the secure data storage platform may be logged by the data access log 506.

Figure 6:
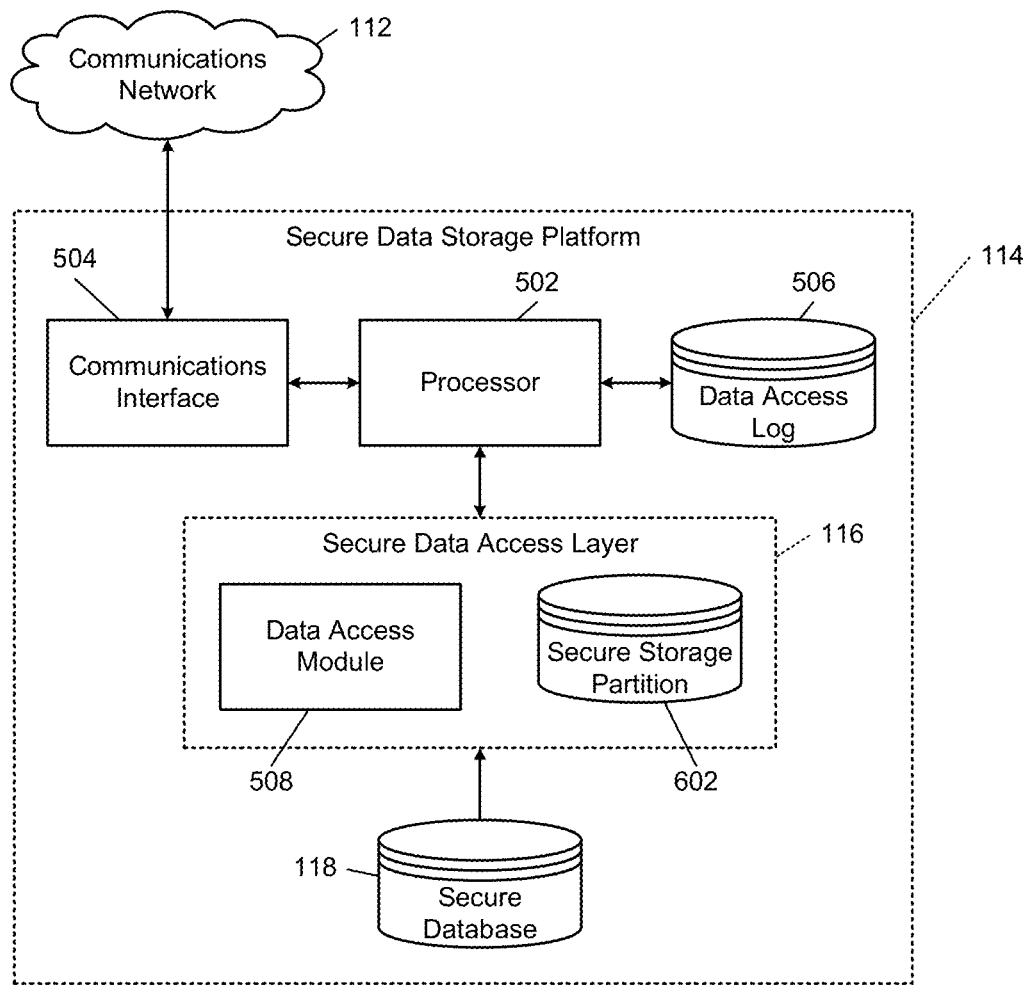
FIG. 6 is a schematic diagram of an example of the secure data storage platform.

FIG. 6 is a schematic diagram of an example of the secure data storage platform 114 of the system 100 of FIG. 1. The secure data storage platform 114 of FIG. 6 may be substantially similar to the secure data storage platform 114 of FIG. 5, except that the data access module 508 may temporarily store the selected data assets in a secure storage partition 602 before returning the selected data assets to the communications network 112 through the processor 502 and/or communications interface 504. In various implementations, the data access module 508 may erase the selected data asset from the secure storage partition 508s after they have been returned through the communications network 112.

Figure 7:
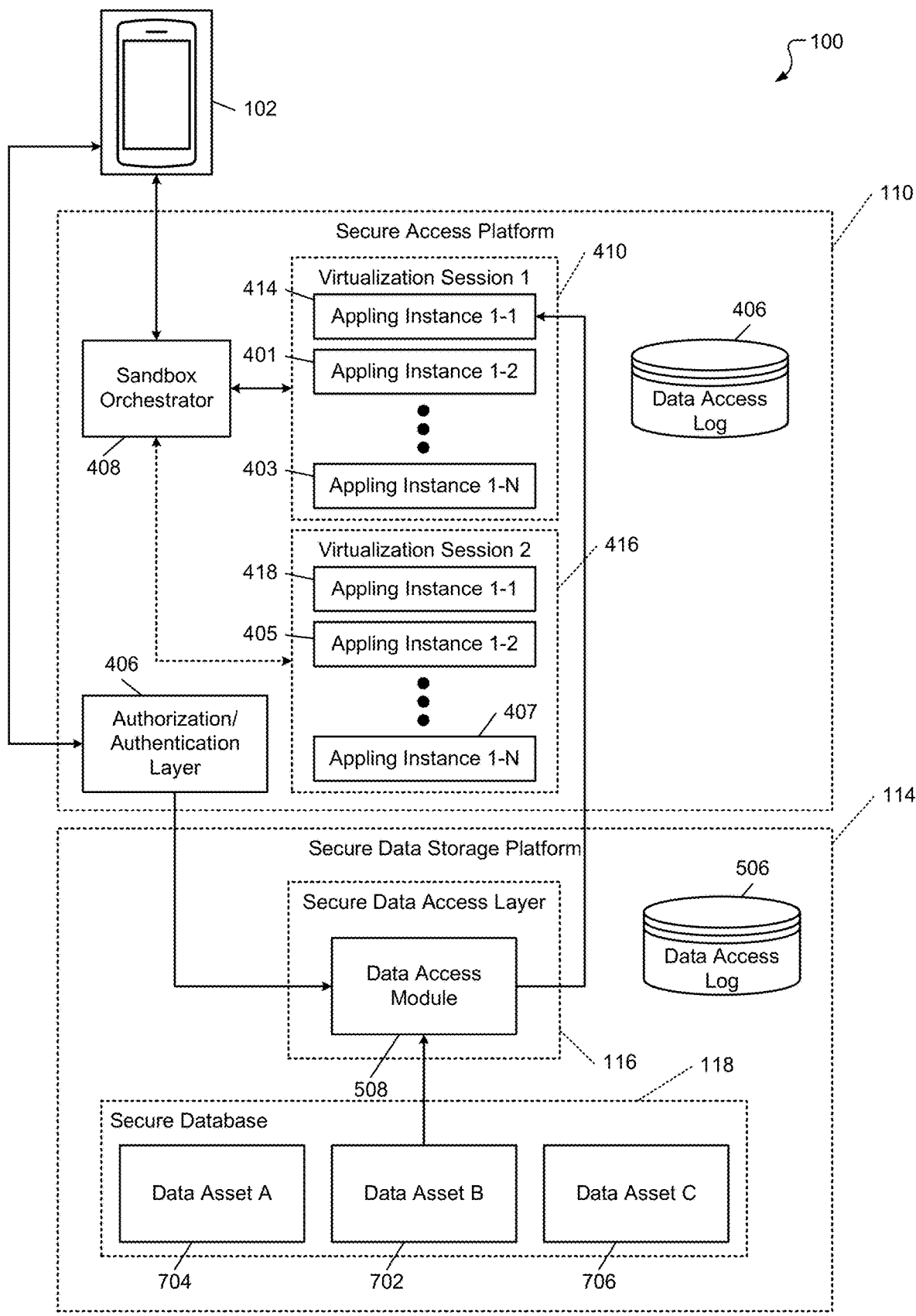
FIG. 7 is a schematic diagram showing data flow in an example of the system.

FIG. 7 is a schematic diagram showing data flow in an example of the system 100 of FIG. 1. In various implementations, the user device 102 sends credentials to the authorization/authentication layer 406, and a request for data to the sandbox orchestrator 408. In various implementations, the credentials and the request for data may each be messages. Messages may be defined as one or more discrete data packets or one or more compilations of discrete digital data packets. Messages may be discrete units of communication intended by the source for consumption by some recipient or group of recipients. In various implementations, messages do not contain executable code. The authorization/authentication layer 406 sends the credentials to the data access module 508, which accesses the data asset(s) on the secure database 118 that the credentials provide access to. For example, if the credentials authorize access to data asset B 702 but not to data asset A 704 or data asset C 706, then the data access module 508 accesses only data asset B 702. After sandbox orchestrator 408 receives the request for data, the sandbox orchestrator 408 creates virtualization session 410, selects an appropriate appling from the appling model catalog 412 (not shown), and runs an appling instance 414 in the virtualization session 410.

The appling instance 414 sends a request for data—such as for data asset B 702—to the data access module 508, for example through the communications interface 404, communications network 112, and communications interface 504. After receiving the request for data from the appling instance 414, the data access module 508 sends the requested data asset (if it is authorized) to the appling instance 414, for example through the communications interface 504, communications network 112, and the communications interface 404. The appling instance 404 may then repackage the data asset provided by the data access module 508 and return the repackaged data asset to the user device 102, for example through the sandbox orchestrator 408, communications interface 404, communications network 112, and communications interface 210.

In various implementations, any data contained within second virtualization session 416 will not be accessible to the appling instance 414. In various implementations, the secure database 118 is not directly accessible to the appling instance 414. Instead, the secure data access layer 116 may send data to the appling instance 414 without the appling instance 414 being able to directly access any data stored on the secure data access layer 116. Thus, only data assets provided by the data access module 508 are accessible to the appling instance 414. Similarly, the user device 102 may only access data assets passed to it from the appling instance 414. The user device 102 does not have the ability to access the data on the secure database 118. In various implementations, credentials are not passed directly from the user device 102 to the data access module 508. Rather, the user device 102 sends the credentials to the authorization/authentication layer 406, which in turn passes the credentials to the secure data access layer 116. Thus, the user device 102 is only able to interface with secure access platform 110, and the secure data storage platform 114 is isolated from direct communication with the user device 102. Accordingly, the user device 102 will not be able to directly access or tamper with data assets stored on the secure database 118, and can only access authorized data assets provided to the appling instance 414 by the secure data access layer 116.

In various implementations, to ensure data assets from the secure database 118 are cannot be retained or aggregated by any appling, each virtualization instance is substantially isolated from each other virtualization instance. Furthermore, in various implementations, each virtualization instance is created for each data request, and torn down and/or deleted after each data request is completed. Thus, the appling instance 414 is used only for a single data request. As the appling instance 414 is "stateless" and/or "pure," the appling instance 414 does not retain any data. However, even in the event that appling instance 414 contains malicious code or has malicious capabilities, virtualization session 410 is closed and may be deleted after each data request is completed. Thus, even if the appling instance 414 is "stateful"—if it retains preceding events, user interactions, or data in a persistent state—the virtualization session 410 containing the appling instance 414 is nevertheless closed and/or deleted after each data request, and any retained information will be erased or purged along with appling instance 414. Additionally, in various implementations, data access log 430 may securely record or log any event or transaction that occurs on secure access platform 110, and data access log 506 may securely record or log any event or transaction that occurs on secure data storage platform 114.

Figure 8:
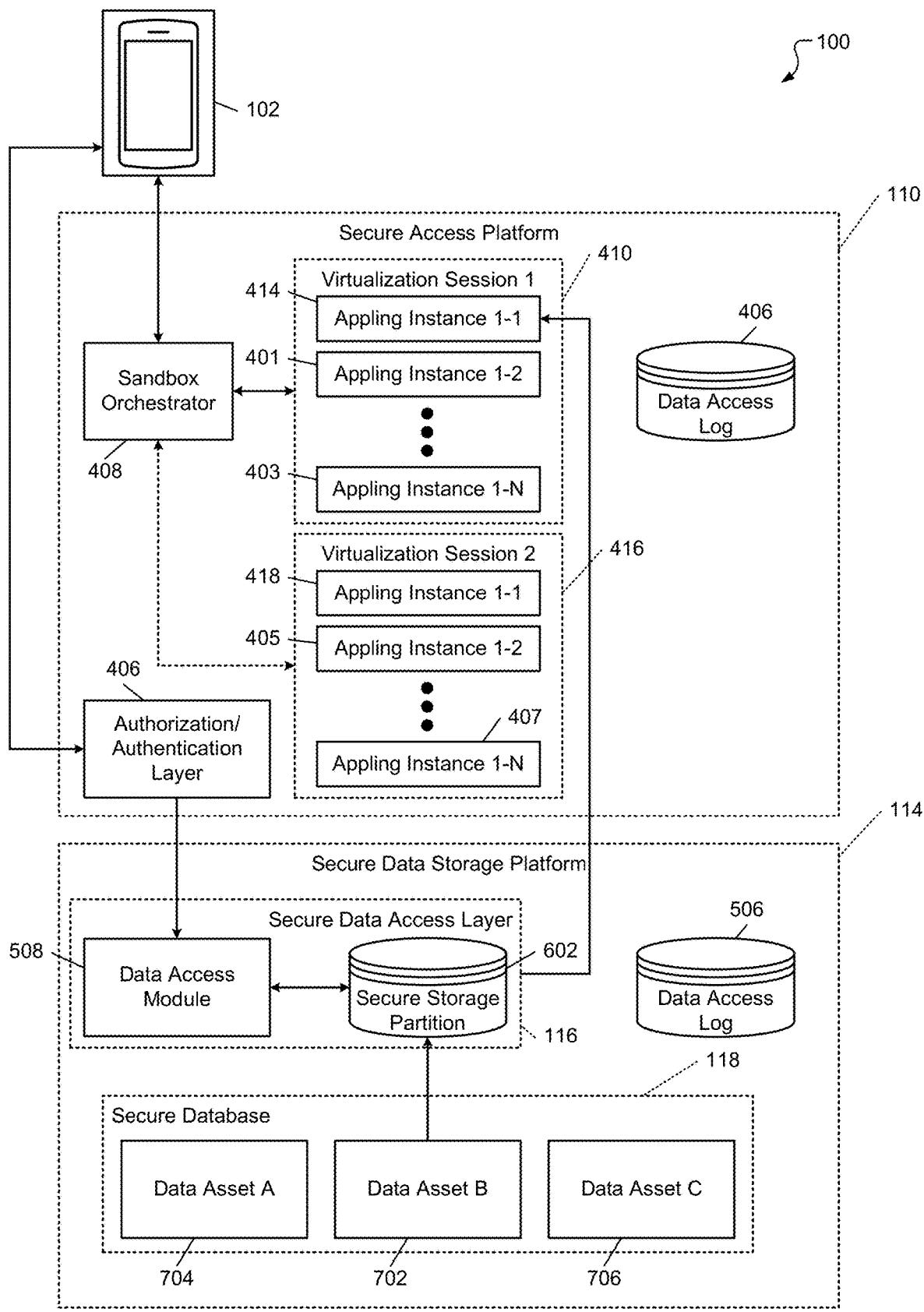
FIG. 8 is a schematic diagram showing data flow in an example of the system.

FIG. 8 is a schematic diagram showing data flow in an example of the system 100 of FIG. 1. The secure data storage platform 114 of FIG. 8 may be substantially similar to the secure data storage platform 114 of FIG. 7, except that the data access module 508 may temporarily store the selected data assets in a secure storage partition 602 before returning the selected data assets to the communications network 112 through the processor 502 and/or communications interface 504. In various implementations, the data access module 508 may erase the selected data assets from the secure storage partition 602 after they have been returned through the communications network 112.

Figure 9:
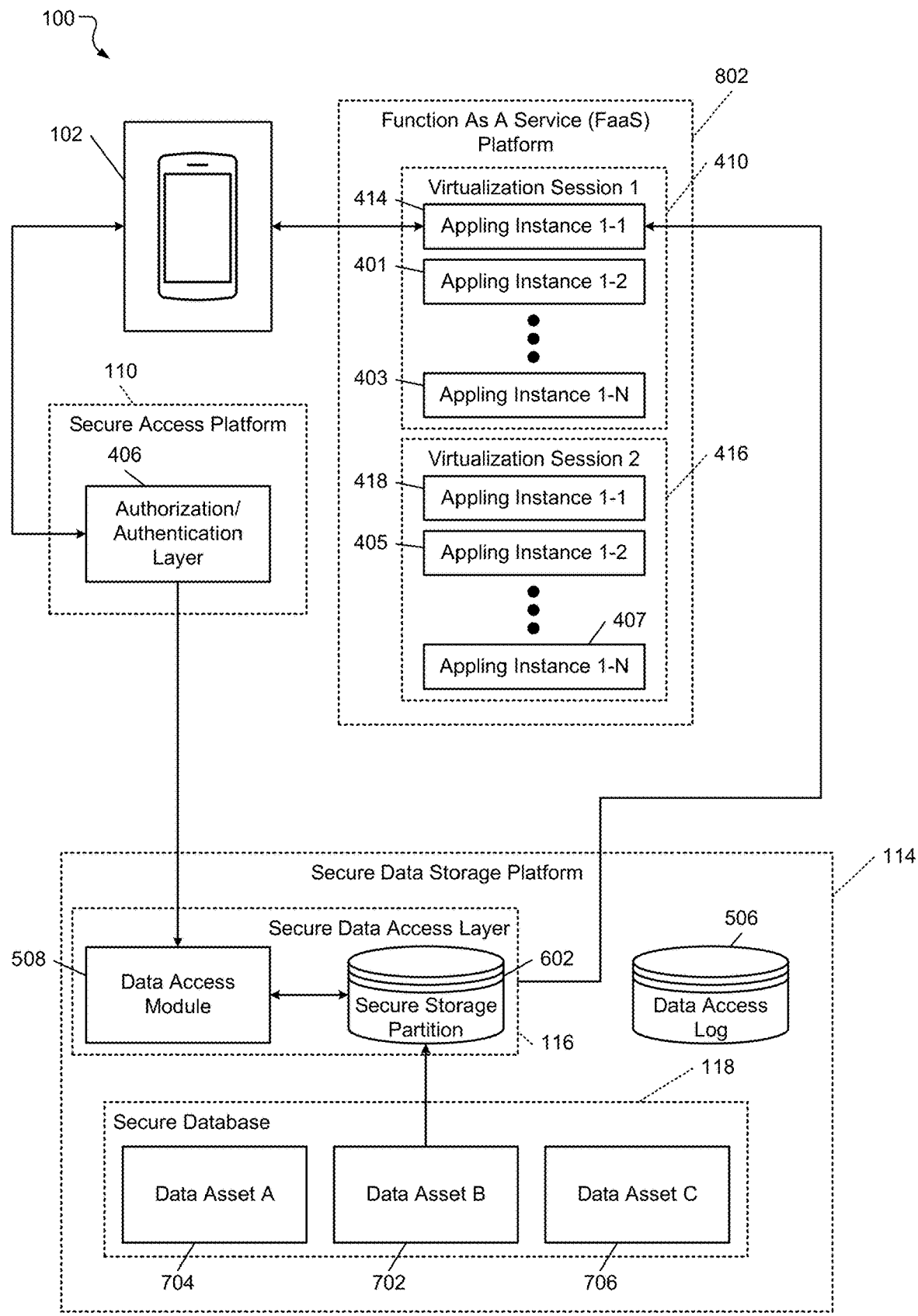
FIG. 9 is a schematic diagram showing an example of the system.

FIG. 9 is a schematic diagram showing additional details associated with some examples of the system 100 of FIG. 1. In various implementations, the applings may be deployed to a cloud computing service server. In various implementations, the applings may be deployed to a cloud computing execution model service, such as a serverless computing service. In various implementations, the applings may be deployed to a function-as-a-service (FaaS) platform 802. In various implementations, the code for each appling may be provided to the FaaS platform 802, and the FaaS platform 802 may execute the appling any time the user device 102 calls an API endpoint at the FaaS platform 802 or otherwise triggers a relevant event. For example, the FaaS platform 802 could generate the virtualization session 410 and the appling instance 414 in response to a request from the Internet browser 212 and/or the data access application 214 of the user device 102.

In various implementations, the FaaS platform 802 may close the appling instance 414 and/or the virtualization session 410 in response to receiving a logout handshake from the Internet browser 212 and/or the data access application 214. In various implementations, the FaaS platform 802 may close the appling instance 414 and/or the virtualization session 410 in response to a session of the Internet browser 212 and/or the data access application 214 timing out. In various implementations, the FaaS platform 802 may close the appling instance 414 and/or the virtualization session 410 in response to a signal to close the appling instance 414 and/or the virtualization session 410 received from the authorization/authentication layer 406. In various implementations, the authorization/authentication layer 406 may be deployed to the secure data storage platform 114.

Figure 10:
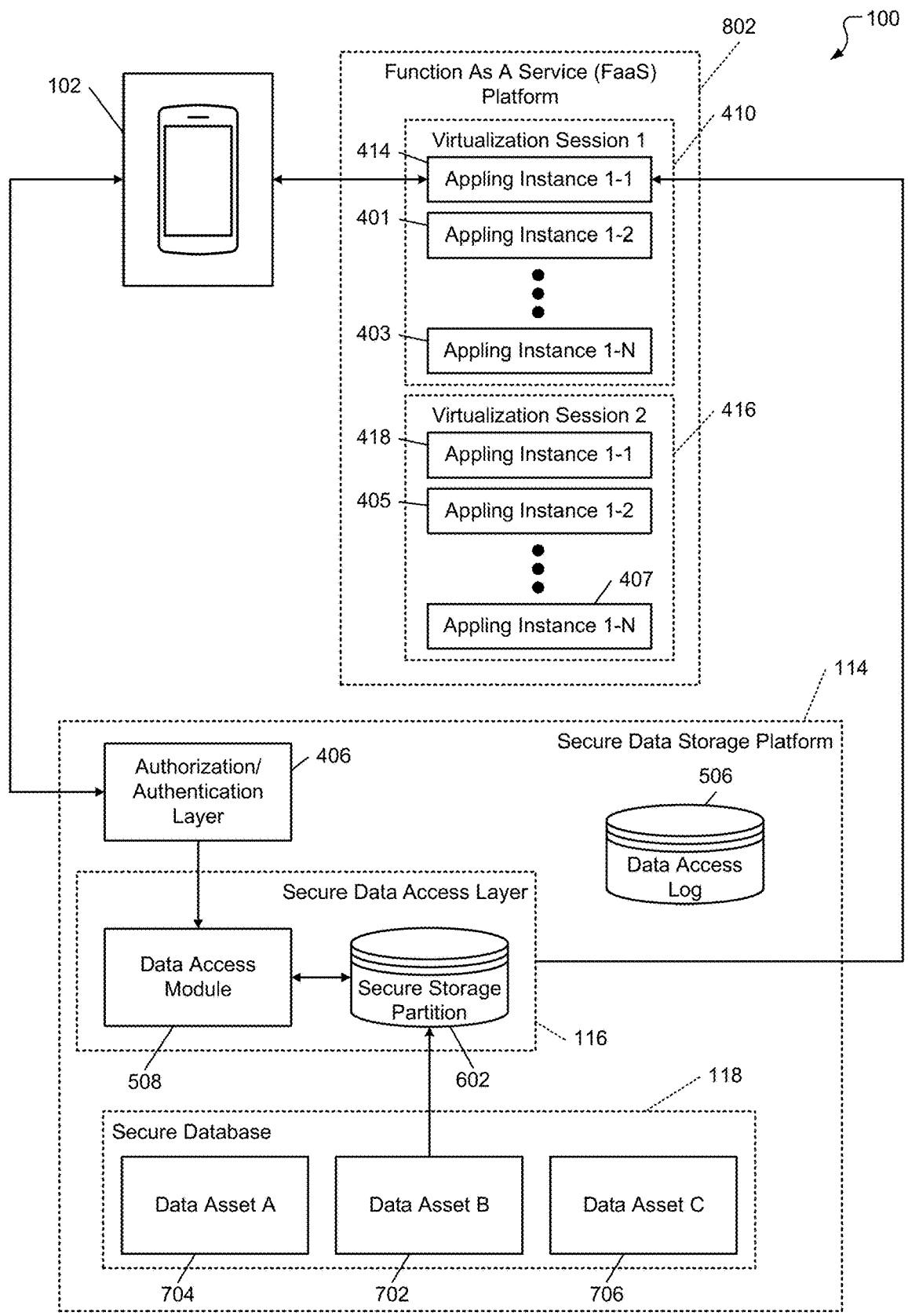
FIG. 10 is a schematic diagram showing an example of the system.

FIG. 10 is a schematic diagram showing additional details associated with some examples of the system 100 of FIG. 1. In various implementations, the applings may be deployed to the FaaS platform 802, but the authorization/authentication layer 406 may be deployed to the secure access platform 110.

The operating environments for the applings are described as being in secure access platforms, function as a service platforms, server platforms, serverless platforms, and the like. The secure access using applings can also be applied to unikernal environments. A unikernel environment is a specialized, single address space machine image constructed by using library operating systems. A developer selects, from a modular stack, the minimal set of libraries, which correspond to the operating system constructs required for the application to run. These libraries are then compiled with the application and configuration code to build sealed, fixed-purpose images (unikernels), which run directly on a hypervisor or hardware without an intervening operating system, such as Linux or Windows. In some examples, each appling only gets the operating system elements that it requires to run. For example, if an appling does not require the file system, then the file system part of the operating system is not complied with that appling. An appling running in this environment may only require some mathematic functions and a communication function related to sending and receiving messages. The appling with only the operating system needed to run the appling can be stored as a virtual machine image that includes the operating system components and the appling functions. In an example, a WebAssembly appling can be complied with its operating system to generate the operating system.

Flowcharts

Figure 11:
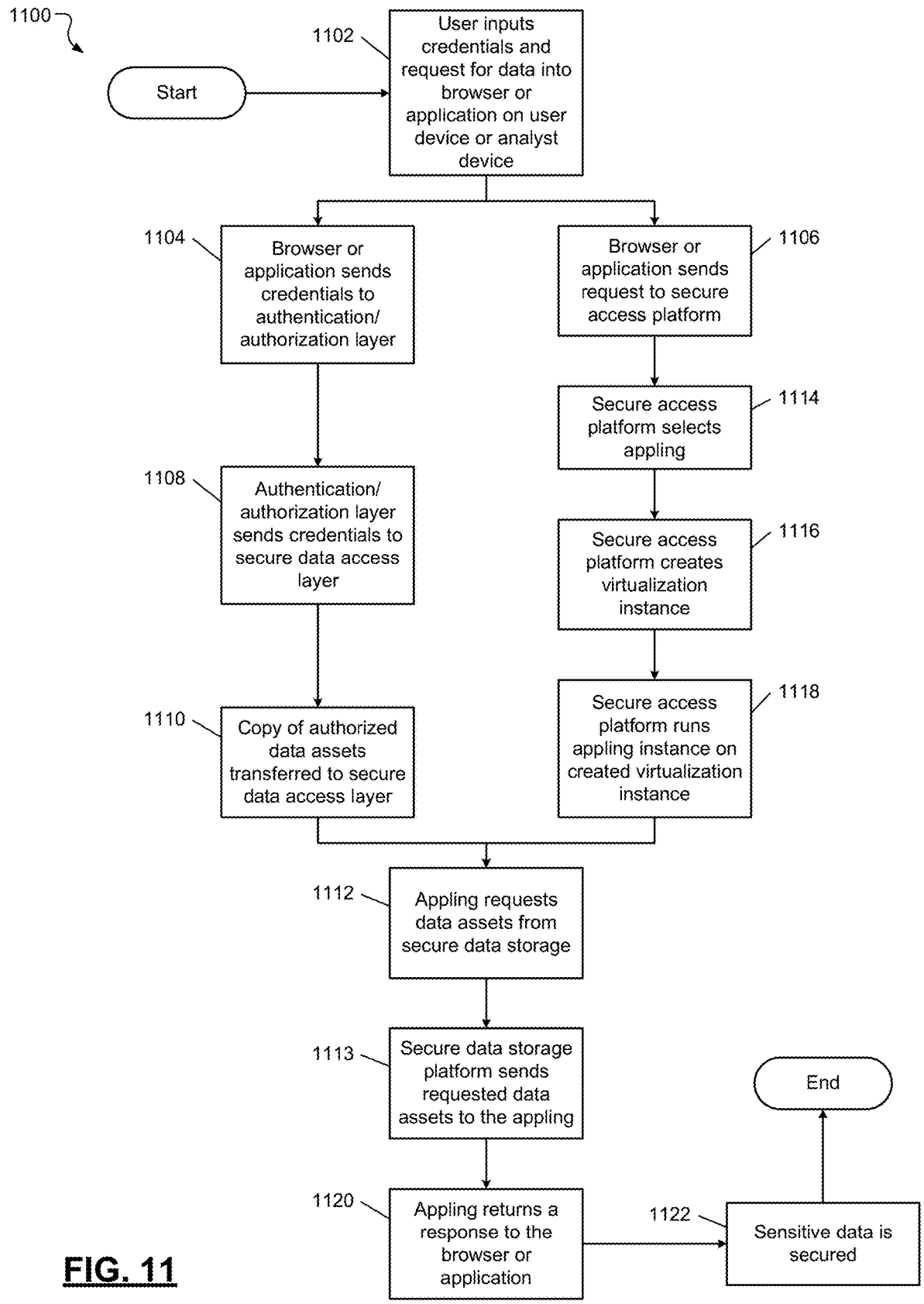
FIG. 11 is a flowchart of an example process to securely provide authorized data assets from a secure database to a client device.

FIG. 11 is a flowchart of an example process 1100 performed by the system 100 of FIG. 1 to securely provide authorized data assets from a secure database to a client device. Control may begin in response to a user logging on to a user device or analyst device, such as any of user devices 102 or 104, or analyst devices 106 or 108. After the user logs on to the user device or analyst device, the user may open an instance of the browser or application on the user device or analyst device, such as Internet browser 212 or data analysis application 214 stored on non-volatile storage 206 of user device 102 or analyst device 106. At 1102, the user may enter the user's credentials and request for data into the browser or application. For example, the user may input the credentials and request into the user interface generated by Internet browser 212 or data analysis application 214 using the touchscreen 208 of the user device 102 or the input device 302 of the analyst device 106. After the user inputs credentials and the request for data, control proceeds to 1104 and 1106. In various implementations, control may execute 1104 and 1106 simultaneously. In various implementations, control may execute 1104 or 1106 in any sequential order.

At 1104, the browser or application sends the credentials to an authentication/authorization layer, such as authentication/authorization layer 406, and control proceeds to 1108. At 1108, the authentication/authorization layer 406 sends the credentials to a secure data access layer, such as secure data access layer 116. Control proceeds to 1110. At 1110, the secure data access layer determines which data assets stored on a secure database, such as secure database 118 the user device or analyst device is authorized to access, and transfers a copy of the authorized data assets to the data access layer. Control proceeds to 1112.

At 1106, the browser or application sends the request for data to a secure access platform, such as secure access platform 110. Control proceeds to 1114. At 1114, the secure access platform selects an appling from an appling model catalog, such as appling model catalog 412, appropriate to the content of the request for data. Control proceeds to 1116. At 1116, the secure access platform creates a virtualization instance. For example, the sandbox orchestrator 408 may create virtualization session 410. Control proceeds to 1118. At 1118, the secure access platform runs the selected appling on the created visualization instance. For example, sandbox orchestrator 408 may run an instance of the appling selected from the appling model catalog 412 on virtualization session 410 as appling instance 414. Control proceeds to 1112.

At 1112, the appling requests the data from the secure data storage platform 114. Control proceeds to 1113. At 1113, the secure access platform 114 sends the requested data to the appling. For example, in response to the request for data from the appling instance 414, the data access module 508 may access a copy of authorized data asset B 702 that was transferred to the secure data access layer 116 at 1110 and send the copy to the appling instance 414. Control proceeds to 1120. At 1120, the appling returns a response to the browser or application. For example appling instance 414 may return the requested data to the Internet browser 212 or data analysis application 214 on user device 102 or analyst device 106. Control proceeds to 1122. At 1122, any sensitive data is secured by being removed from the secure access platform 110 and secure data access layer 116.

Figure 12:
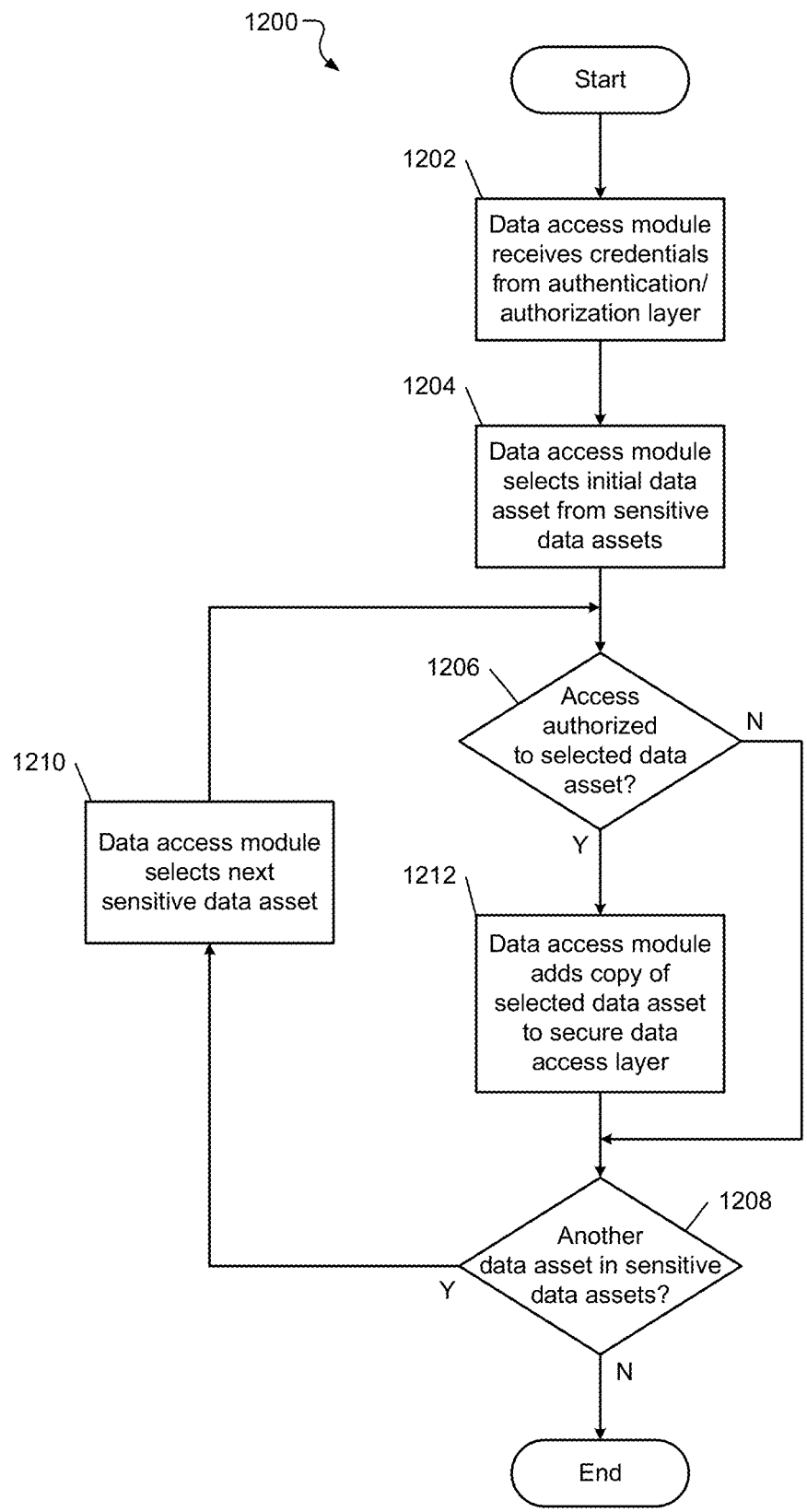
FIG. 12 is an example flowchart of a process to transfer a copy of authorized data assets to the secure data access layer.

FIG. 12 is an example flowchart of a process 1200 which may be performed by the secure data access layer 116 at 1110 of process 1100 to transfer a copy of the authorized data assets to the secure data access layer 116. At 1202, a data access module receives credentials from the authentication/authorization layer. For example, data access module 508 may receive the credentials from the authorization/authentication layer 406. Control proceeds to 1204. At 1204, the data access module may select an initial data asset from among sensitive data assets stored on the secure database. For example, data access module 508 may select data asset A 704 stored on secure database 118. Control proceeds to 1206. At 1206, the data access module 508 may determine whether the credentials provide access to the selected data asset. For example, data access module 508 may determine whether the credentials received from the authorization/authentication layer 406 provides access to data asset A 704. If at 1206, the data access module determines that the credentials do not provide access to the selected data asset, control proceeds to 1208. For example, data access module 508 may determine that the credentials do not provide the user with access to data asset A 704, and data access module 508 proceeds to 1208 to determine whether another data asset is present in the sensitive data assets. For example, at 1208, the data access module 508 may determine whether another sensitive data asset is present in secure database 118.

If at 1208, the data access module determines that another sensitive data asset module is present in the sensitive data assets, control proceeds to 1210. For example, at 1208, the data access module 508 may determine that data asset B 702 and data asset C 706 in secure database 118 have not yet been analyzed. Accordingly, data access module 508 may proceed to 1210. At 1210, the data access module 508 selects the next sensitive data asset. For example, data access module 508 may select data asset B 702 and proceed to 1206. If at 1206, the data access module 508 determines that the credentials provide authorize the user to have access to the selected data asset, control proceeds to 1212. For example, the data access module 508 may determine that the credentials provide the user with access to selected data asset B 702. The data access module 508 then proceeds to 1212 to add a copy of the selected data asset to the secure data access layer 116. In various implementations, the data access module 508 temporarily retains a copy of data asset B 702. In various implementations, the data access module 508 adds a copy of data asset B to secure storage partition 602 on the secure data access layer 116. After 1212 is complete, control proceeds to 1208.

Figure 13:
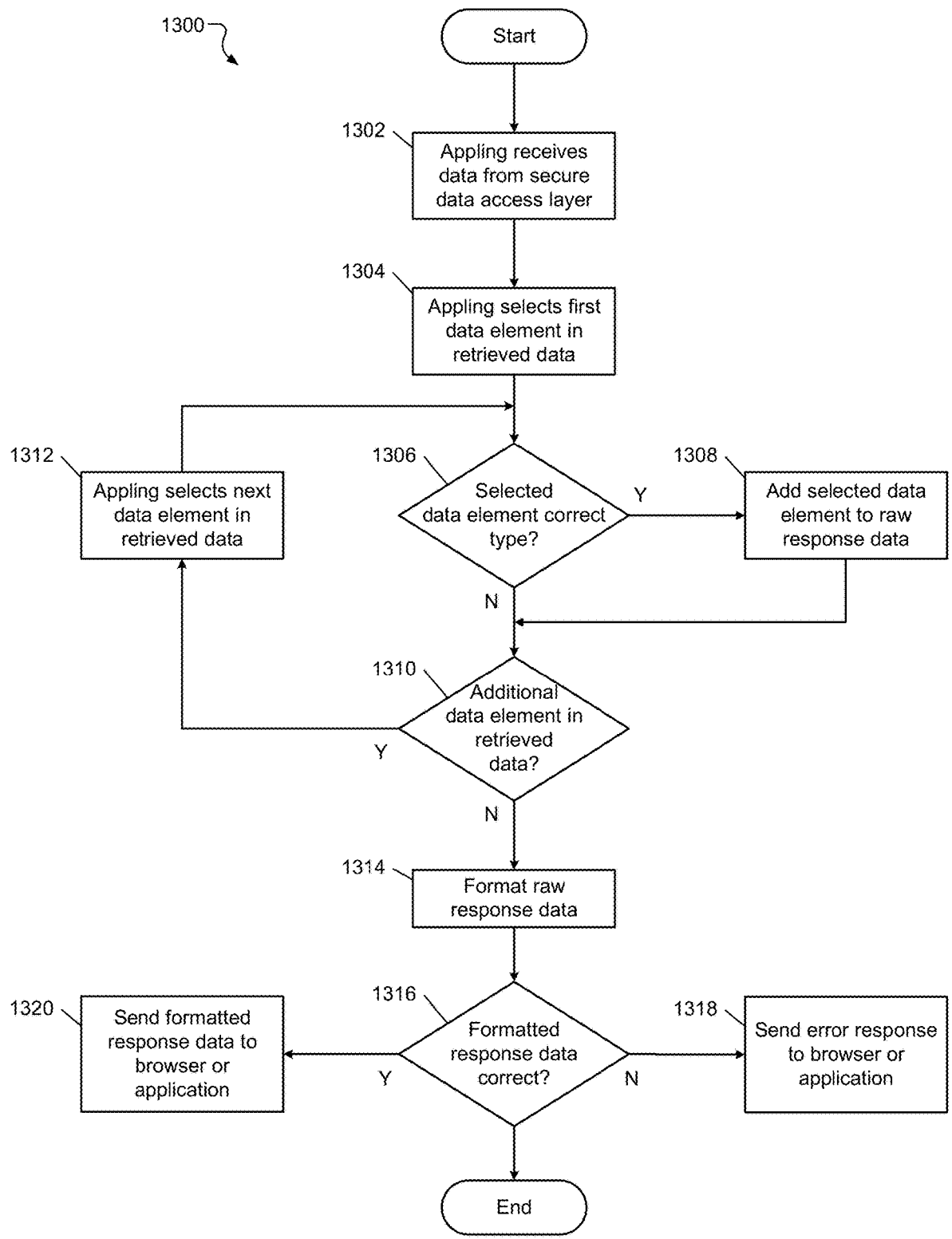
FIG. 13 is an example flowchart of a process to return a response.

FIG. 13 is an example flowchart of a process 1300 which may be performed by the appling instance 414 at 1120 of process 1100 to return a response to the Internet browser 212 or data analysis application 214. At 1302, appling instance 414 may receive data from secure data access layer 116, such as at step 1113 of process 1100. For example, appling instance 414 may receive data from the data access module 508 or the secure storage partition 602. Control proceeds to 1304. At 1304, the appling instance 414 may select the first data element in the received data. Control proceeds to 1306. At 1306, the appling instance 414 determines whether the selected data element is the correct type of data. If at 1306, the appling instance determines that the selected data element is the correct type of data, control proceeds to 1308. Otherwise, control proceeds to 1310. At 1308, the appling instance 414 adds the selected data element to raw response data and proceeds to 1310. At 1310, the appling instance 414 determines whether there is an additional unevaluated data element present in the received data. If an additional unevaluated data element is present at 1310, control proceeds to 1312. Otherwise, control proceeds to 1314.

At 1312, the appling instance 414 selects the next data element in the retrieved data and proceeds to 1306. At 1314, the appling instance 414 formats the raw response data into a suitable data format readable by the Internet browser 212 or the data analysis application 214. Control proceeds to 1316. At 1316, the appling instance 414 may determine whether the formatted response data is empty. If at 1316, the appling instance 414 determines that the formatted response data is empty, the appling instance 414 proceeds to 1318 and sends an error response to the Internet browser 212 or data analysis application 214. Otherwise, the appling instance 414 proceeds to 1320 and sends the formatted response data to the Internet browser 212 or data analysis application 214.

In addition to the example process 1300 of FIG. 13, below is an example of Rust code that may be used to program the appling instance 414 to extract drug information from pharmacy claims retrieved from data asset B 702 and produce either an error response or a response in the FHIR format:

use itertools::Itertools;
use vibrant::data::DataPacket;
use vibrant::fhir::{Claim, FhirResponse};
use vibrant::request::{Request, Response, VibrantError};
pub fn appling(req: Request, data: DataPacket)→
Result<impl Response, VibrantError>{
//The appling receives the pharmacy claims from the secure data access layer 116
let claims=data.claims( )!;
let rx_claims_iter=claim_data.iter( )filter(|claim|claim.is_rx( );
//The appling extracts the drug information from the retrieved pharmacy claims
let drugs in question=rx_claims_iter
.clone( )
.flat_map(|rx_claim|rx_claim.drugs(_)
.unique( )
.collect::<Vec<_>>( )
//The appling queries a formulary for drug information
let drug_info=data
.formulary_service( )
.info_for_drugs(&drugs in question)?;
//The appling assembles the response for the Internet browser 212 or data analysis application 214 in the FHIR format let response=FhirResponse::new_from_claims(claims)
.for patient(req.patient_info( )
.with content(drug_info)
.to_fhir( )
Ok(response)
{

Figure 14:
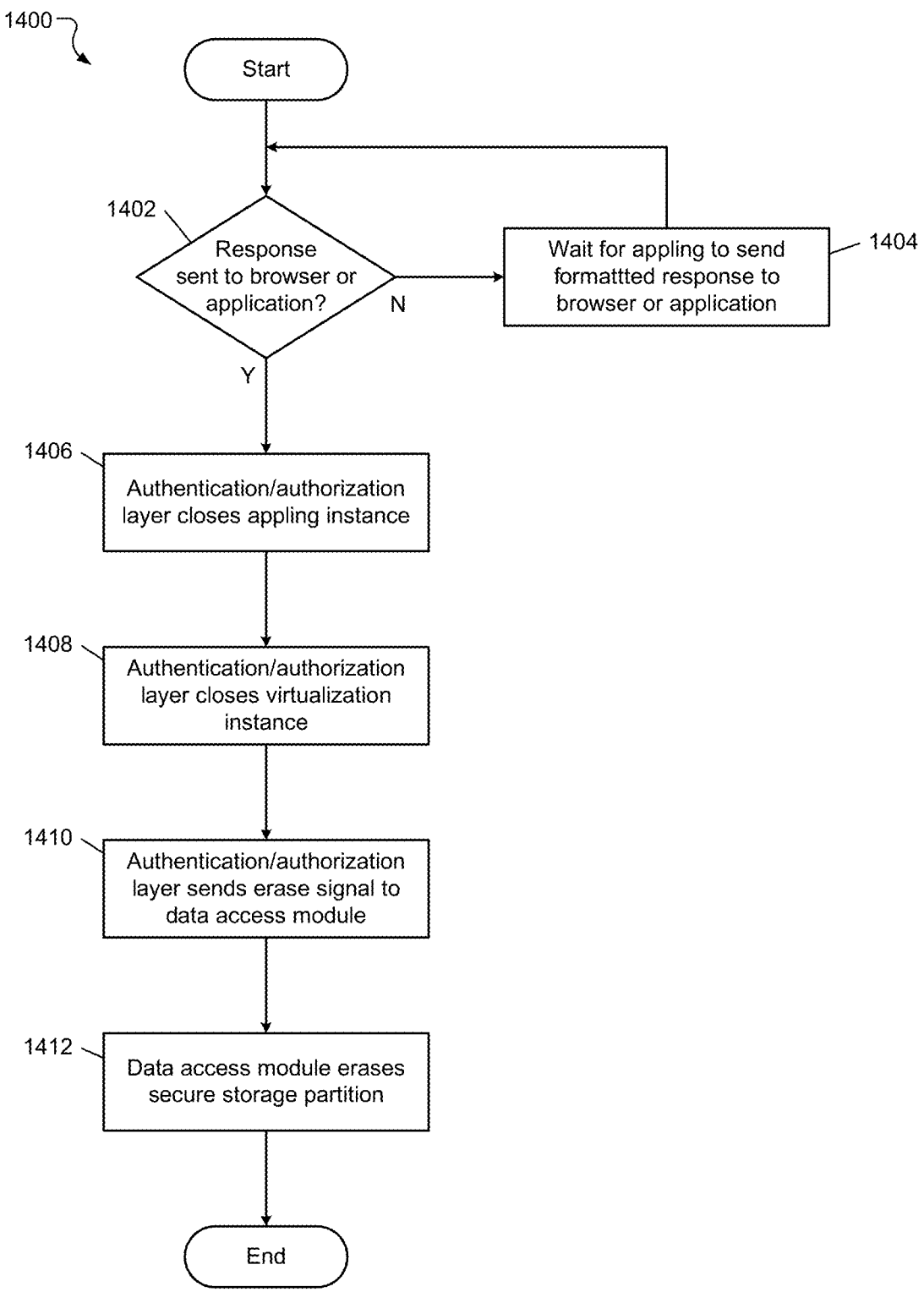
FIG. 14 is an example flowchart of a process for ensuring that sensitive data is secured after the appling returns a response.

FIG. 14 is an example flowchart of a process 1400 which may be performed by the system 100 at 1122 of process 1100 to ensure that sensitive data is secured after the appling returns a response to Internet browser 212 or data analysis application 214. At 1402, control determines whether the appling instance 414 sent a response to the Internet browser 212 or the data analysis application 214 at 1120 of process 1100 or 1320 of process 1300. If at 1402, control determines that a response has not been sent, control proceeds to 1404 to wait for a response to be sent. After 1404, control proceeds back to 1402. If at 1402, control determines that a response has been sent, control proceeds to 1406. At 1406, the authorization/authentication layer 406 causes the sandbox orchestrator 408 to close the appling instance 414. Control proceeds to 1408. At 1408, the authorization/authentication layer 406 causes the sandbox orchestrator 408 to close and/or erase virtualization session 410. Control proceeds to 1410. At 1410, the authorization/authentication layer 406 sends an erase signal to the data access module 508. Control proceeds to 1412. At 1412, the data access module 508 erases the secure storage partition 602.

FIG. 15 is an example flowchart of a process 1500 which may be performed by the system 100 at 1122 of process 1100 to ensure that sensitive data is secured. Control may begin simultaneously at 1502 and 1504. At 1502, the secure access platform 110 begins a timer. Control proceeds to 1506. At 1506, the secure access platform 110 monitors for a secure handshake signal from the Internet browser 212 or the data analysis application 214 of the user device 102 or the analyst device 106 as appropriate. Control proceeds to 1508. At 1508, if the secure access platform 110 determines that a secure handshake has been received, control proceeds to 1510. Otherwise, control proceeds to 1512. At 1510, the secure access platform 110 resets the timer and proceeds back to 1506. At 1512, the secure access platform 110 determines whether the elapsed time exceeds a preselected threshold. If at 1512 the secure access platform 110 determines that the elapsed time does not exceed the preselected threshold, then control proceeds to 1514. Otherwise, control proceeds to 1516. At 1514, the secure access platform 110 continues running the timer and proceeds back to 1506.

At 1504, the secure access platform 110 monitors for a successful logout handshake from the Internet browser 212 or data analysis application 214 of the user device 102 or the analyst device 106. Control proceeds to 1518. At 1518, the secure access platform 110 determines whether a secure logout handshake has been received. If at 1518, a secure logout handshake has been received at the secure access platform 110, control proceeds to 1516. Otherwise, control proceeds to 1520, and the secure access platform 110 continues monitoring for a successful logout handshake. After 1520, control proceeds back to 1518.

At 1516, the authorization/authentication layer 406 causes the sandbox orchestrator 408 to close and/or erase the appling instance 414. Control proceeds to 1522. At 1522, the authorization/authentication layer 406 causes the sandbox orchestrator 408 to close and/or erase the virtualization session 410. Control proceeds to 1524. At 1524, the authorization/authentication layer 406 sends an erase signal to the data access module 508. Control proceeds to 1526. At 1526, the data access module 508 erases the secure storage partition 602.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for providing compartmented access to secure data assets, comprising:
    a mobile device, comprising:
        a first processor,
        an input device,
        a data analysis application, and
        a first transceiver;
    a secure access platform, comprising:
        an authentication module,
        a sandbox orchestrator,
        a second processor,
        an appling model catalog, and
        a second transceiver; and
    a secure data storage platform, comprising:
        a third processor,
        a secure data access module,
        a secure database comprising a secure data asset, and
        a third transceiver,
    wherein the first processor, the input device, and the data analysis application are configured to generate a user interface configured to allow a user to input credentials and a request for the secure data asset,
    wherein the first processor, the data analysis application, and the first transceiver are configured to:
        transmit the credentials to the authentication module via the second transceiver, and
        transmit the request for access to the sandbox orchestrator via the second transceiver,
    wherein the second processor, the authentication module, and the second transceiver are configured to transmit the credentials to the secure data access module via the third transceiver,
    wherein the third processor and the secure data access module are configured to transfer a copy of the secure data asset to the secure data access module,
    wherein the second processor, the sandbox orchestrator, and the second transceiver are configured to:

generate a virtualization instance,
select an appling from the appling model catalog, and
create an appling instance of the selected appling in the virtualization instance, and
wherein the second processor, the sandbox orchestrator, the appling instance, and the second transceiver are configured to:
receive the copy of the secure data asset from the secure data access module,
format a response package based on the copy of the secure data asset, and
transmit the response package to the data analysis application via the first transceiver.

2. The system of claim 1, wherein:
the secure database comprises a plurality of unauthorized data assets; and
the secure data access module is configured to:
determine that the credentials do not provide access to each of the plurality of unauthorized data asset, and
determine that the credentials provide access to the secure data asset.

3. The system of claim 2, wherein the third processor and the secure data access module are configured to transfer a copy of the secure data asset to a secure storage partition.

4. The system of claim 1, wherein the second processor, the sandbox orchestrator, the appling instance, and the second transceiver are configured to:
determine that the copy of the secure data asset contains a correct data type; and
in response to determining that the copy of the secure data asset contains the correct data type, format the response package to contain data extracted from the secure data asset.

5. The system of claim 4, wherein the response package is formatted in a Fast Healthcare Interoperability Resources (FHIR) format.

6. The system of claim 1, wherein the second processor, the sandbox orchestrator, the appling instance, and the second transceiver are configured to:
determine that the copy of the secure data asset does not contain a correct data type; and
in response to determining that the copy of the secure data asset does not contain the correct data type, format the response package to contain an error code.

7. The system of claim 1, wherein the second processor, the authentication module, and the sandbox orchestrator are configured to close the appling instance in response to a condition.

8. The system of claim 7, wherein the second processor, the authentication module, and the sandbox orchestrator are configured to close the virtualization instance in response to the condition.

9. The system of claim 8, wherein the second processor, the authentication module, and the sandbox orchestrator are configured to send an erase signal to the secure data access module.

10. The system of claim 9, wherein the third processor and the secure data access module are configured to purge the copy of the secure data asset from the secure data access module in response to the erase signal.

11. The system of claim 7, wherein the condition comprises transmission, by the second processor, the sandbox orchestrator, the appling instance, and the second transceiver, of the response package.

12. The system of claim 7, wherein the condition comprises a determination by the authentication module that a session of the data analysis application timed out.

13. The system of claim 7, wherein the condition comprises a determination by the authentication module that a session of the data analysis application ended.

14. The system of claim 1, wherein the second processor and the sandbox orchestrator are configured to:
generate a second virtualization instance;
select a second appling from the appling model catalog; and
create a second appling instance of the selected second appling in the second virtualization instance.

15. The system of claim 14, wherein:
the virtualization instance is isolated from the second virtualization instance; and
the appling instance is isolated from the second appling instance.

16. The system of claim 15, wherein the mobile device is isolated from the second virtualization instance and the second appling instance.

17. A method for providing compartmenting access to secure data assets, the method comprising:
transmitting credentials from a mobile device to an authentication module on a secure access platform;
transmitting a request for access from the mobile device to a sandbox orchestrator on the secure access platform;
transmitting the credentials from the authentication module to a secure data access module on a secure data storage platform;
determining, at the secure data access module, which of a plurality of secure data assets stored on a secure database the credentials provide access to;
transferring, to the secure data access module, selected data assets, wherein the selected data assets are the secure data assets that the credentials provide access to;
generating, at the secure access platform, a virtualization instance;
running, at the secure access platform, an appling instance in the virtualization instance;
receiving the selected data assets transmitted from the secure data access module using the appling instance;
formatting the selected data assets using the appling instance; and
transmitting the formatted selected data assets from the appling instance to the mobile device.

18. The method of claim 17, wherein the formatted selected data assets are in a Fast Healthcare Interoperability Resources (FHIR) format.

19. The method of claim 17, further comprising:
closing the appling instance in response to transmitting the formatted selected data assets from the appling instance to the mobile device; and
closing the virtualization instance in response to transmitting the formatted selected data assets from the appling instance to the mobile device.

20. The method of claim 17, further comprising:
generating, at the secure access platform, a second virtualization instance; and
running, at the secure access platform, a second appling instance in the second virtualization instance,
wherein:
the virtualization instance is isolated from the second virtualization instance, and
the appling instance is isolated from the second appling instance.

* * * * *